United States Patent [19]
Ruffolo

[11] Patent Number: 4,807,570
[45] Date of Patent: Feb. 28, 1989

[54] SEQUENTIALLY CHARGED INTAKE MANIFOLD

[76] Inventor: Russ F. Ruffolo, 417 W. Geneva Rd., Glen Ellyn, Ill. 60137

[21] Appl. No.: 100,736

[22] Filed: Sep. 24, 1987

[51] Int. Cl.$^4$ ............................................. F02B 75/18
[52] U.S. Cl. ............................................. 123/52 MB
[58] Field of Search .......... 123/52 M, 52 MC, 52 MB

[56] References Cited

U.S. PATENT DOCUMENTS

| | | | |
|---|---|---|---|
| 1,103,931 | 7/1914 | Bennett | 123/52 M |
| 1,683,281 | 9/1928 | Asire | 123/52 M |
| 3,735,744 | 5/1973 | Brody et al. | 123/52 M |
| 3,977,366 | 8/1976 | Yamaguchi et al. | 123/432 |
| 3,998,195 | 12/1976 | Scott | 123/590 |

FOREIGN PATENT DOCUMENTS 2125483  3/1984  United Kingdom ............ 123/52 M

*Primary Examiner*—David A. Okonsky

[57] ABSTRACT

An intake manifold for an internal combustion engine, constructed of any material, having individual runners which have honeycombed mini-venturi positioned within their length at intervals, serving each cylinder of an engine, the engine being air-cooled or liquid cooled, normally aspirated or super-charged, having entry and exit provisions communicating with the interior of each individual runner of the intake manifold at a point in close porximity to the inlet valve or port so as to be positioned in a favorable area to be able to accept, channel, and redirect the accelerated gaseous conbustable mixture by the harnessing of the momentum or kinetic force of the incoming swiftly moving gaseous mixture which is left uncontrolled, would become turbulent and obstructive to the succeeding stroke or incoming charge, redirecting it into the next intake runner which follows in the firing order sequence so as to effect a mild super-charging, in effect increase volumetric efficiency of the cylinder being charged.

1 Claim, 2 Drawing Sheets

SEQUENTIALLY CHARGED INTAKE MANIFOLD

BACKGROUND OF THE INVENTION

1. Field of the Invention

The invention stated heretofore relates to the induction, compressing, accelerating, and delivering of a combustable gaseous mixture, to promote and produce complete and efficient combustion in the combustion chambers of internal combustion engines either air, liquid cooled, gas or diesel, normally aspirated or super-charged, thereby effecting greater economy, power, and lower levels of exhaust pollutants so as to better comply with E.P.A. standards.

2. Background Art

My stated invention the SEQUENTIALLY CHARGED INTAKE MANIFOLD is superior in function and design than A. O. Bennett U.S. Pat. No. 1,103,931, or H. W. Asire U.S. Pat. No. 1,683,281, in the following areas of construction and function, the "SEQUENTIALLY CHARGED INTAKE MANIFOLD" embodies a network of tubes or ducts, each having a plenum at one of its end connected in pairs to each intake runner of the intake manifold, downstream of the carburetor or air-horn opening, the interior grooved or striated walls of the intake runners having honey-combed mini-venturi positioned at intervals along their entire interior length, the function of the network of tubes being that of accepting and redirecting the accelerated gaseous mixtures produced within the individual honey-combed mini-venturi of the individual intake runners entry and exit points in such a manner so as to harness and redirect the otherwise detrimental negative forces which occur when the inlet valves or ports are abruptly closed. The kinetic forces or momentum of the gaseous mixture flow is contained in the plenum section and redirected in a beneficial way so as to enhance or fortify the incoming gaseous mixture and reroute the flow to the appropriate intake runner next in the intake stroke or cycle, promoting complete and efficient combustion to produce greater horsepower and economy.

SUMMARY OF THE INVENTION

The stated invention consists of an intake manifold having individual intake runners grooved interior walls, originating from a central location, extending to the mating flanges or junction of the inlet valve or port and manifold, there being a network of tubes or ducts each having a plenum on one of its ends, the tubes being tapped into the interior walls of the intake runners communicating fluidly with the interior grooved walls of the intake manifold in which are positioned honey-combed mini-venturis. On opposite sides of the exit points of the runners or down-stream position so as to be placed in close proximity to the inlet port or valve, one of the tubes or ducts functioning as a plenum or accumulator attached to one side of the individual runner downstream of the carburetor or air horn leading to and tapped into the entry point of the next intake runner which is in the succeeding intake stroke of the sequential firing order, the intake runner having a honey-combed mini-venturi positioned at intervals along its entire length so as to form plenums in between. The other tubes or ducts originating from the preceeding intake runner which is ahead in the sequential firing order position, producing an intake runner in which there are two or more tubes or ducts attached and communicating fluidly with the interior of the runner, the specific function being to accept the gaseous mixture's velocity and pressure which is disturbed by the abrupt closing of the inlet valve or port, if left unattended would cause turbulence within the intake runner passage, upsetting or disrupting the succeeding incoming mixture flow, but by utilizing that kinetic energy and redirecting it into the next intake runner in the successive intake stroke cycle sequence in the firing order so as to effect a mild super-charging and atomizing effect on the gaseous combustable mixture entering the intake valve or port during the intake cycle producing greater volumetric efficiency for that given cylinder, effecting an increase in power and economy.

BRIEF DESCRIPTION OF THE PREFERRED EMBODIMENTS

Figure 1:
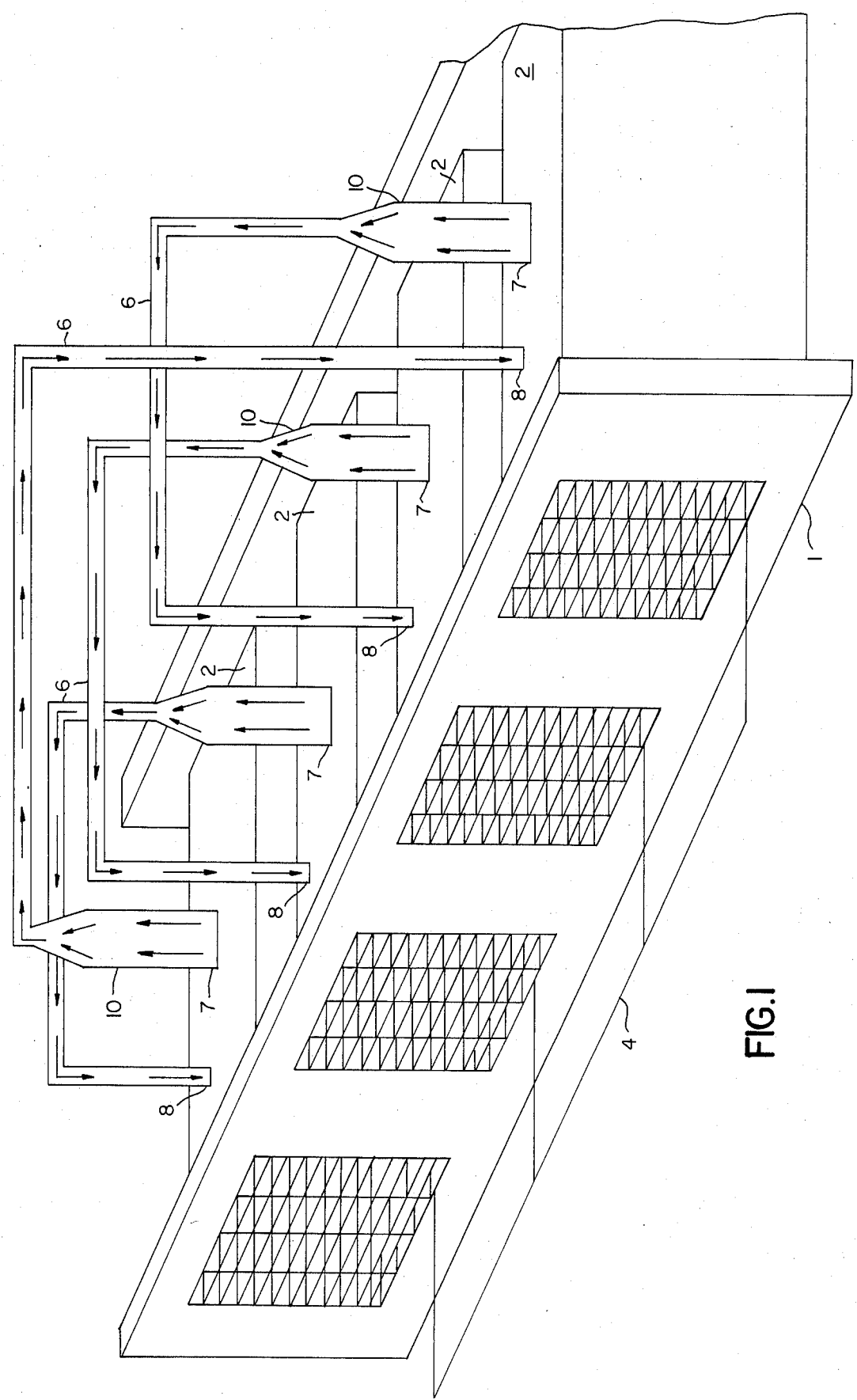
FIG. 1. Shows a dimensional view of the invention, showing views of the individual runners, honey-comberd mini-venturi, tubes or ducts plenum or accumulator sections, entry and exit points, valve port and carburetor or air-horn mounting flanges.
Figure 3:
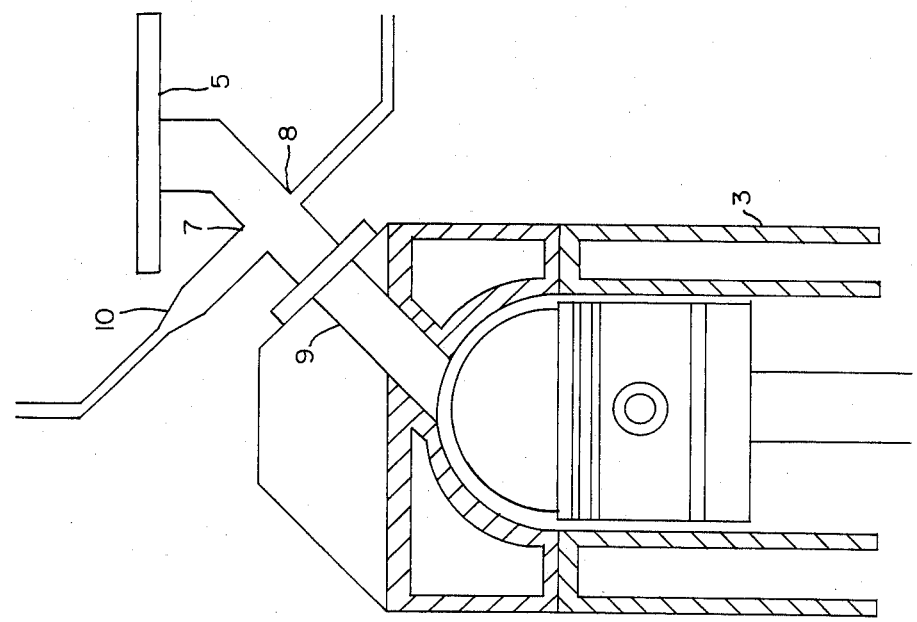
FIG. 3. Shows a cross-sectional view of the individual intake runner in position attached to the cylinder head of an engine, showing access into the combustion area of the cylinder head.
Figure 2:
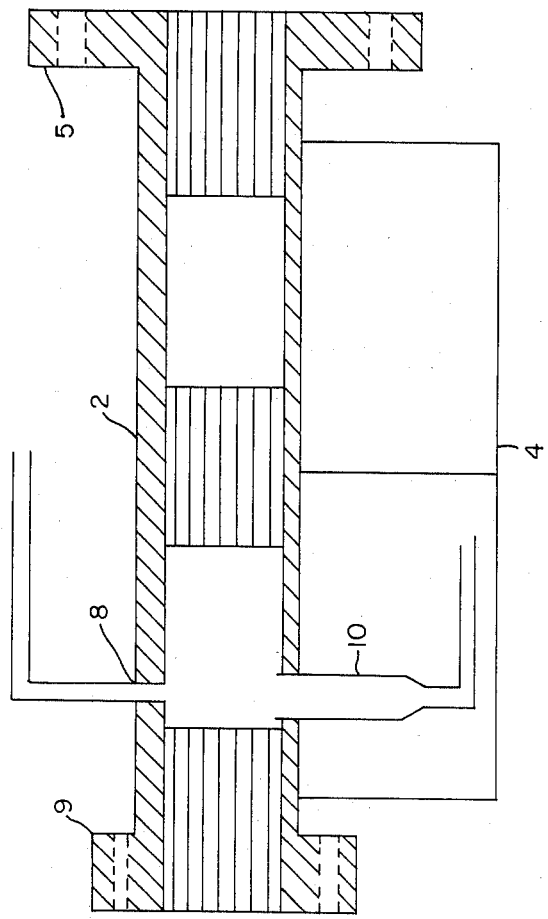
FIG. 2 Shows a cross-sectional view of an individual intake runner with its containment of the honey-combed mini-venturi, the fluidly communicating tubes or ducts, accumulator and plenum sections, and also the valve port and carburetor or air-horn mounting flanges.

In reference to the drawings, the construction of the induction system I have invented for the internal combustion engine, air or water cooled, lends itself easily for description and function of its unique sections. The intake manifold (1) is constructed of any material, having as many individual runners (2) as needed to service the given cylinders (3) of the specific engine. Each individual runner (2) having a honey-combed mini-venturi (4) positioned at intervals within its entire length, having an entry (8) and exit (7) provision or outlet positioned downstream of the carburetor or air-horn (5), to which tuves or ducts (6) can be attached to both sides of the exit point (7) placed as close as possible to the inlet valve or port (9). On any given individual runner (2) having two or more tubes or ducts (6) attached to its sides in close proximity to the inlet valves or ports (9), one of the tubes or ducts (6) having an accumulator or plenum section (10) which we will call the exiting tube (7) for the purpose of explaination, will lead to the entry point (8) of the intake runner which is next in sequence in the firing order position and is positioned as close as possible to the inlet valve or port (9), that same tube or duct (6) intersecting and communicating fluidly with the intake runner (2) will be designated the entry point tube (8) at that position, the other tube attached to the specified individual runner will lead back to the runner which is preceeding in the firing order sequence, having an accumulator or plenum section (10), is attached to and communicating fluidly with the interior of that individual runner's (2) exit position (7). As the piston starts its intake cycle drawing in its gaseous combustable mixture, the flow is accelerated by the honey-combed mini-venturi (4) positioned within the individual runners (2) downstream toward the open inlet valve or port (9) as the gaseous mixture or air enters the open valve (9) upon completion of the intake cycle the inlet valve or port (9) closes abruptly the blocked flow of accelerated gaseous mixture is channeled and diverted into the plenum by its own momentum or kinetic energy into the succeeding runners intake stroke in the engines firing order sequence, effecting a mild super-charging of the given cylinder being charged, promoting complete volumetric efficiency therefore increased available horsepower and economy, while reducing levels of exhaust pollutants to better comply with existing strict E.P.A. requirements.

I claim:

1. An intake system for intercommunicating charge means and combustion chamber means of an internal combustion engine comprising: a cylinder head, intake port means provided in said cylinder head, intake valve means provided in said intake port means, at least two intake runner means connected to said cylinder head, each of said runner means in communication with a respective one of said intake port means, each said runner means internally having at spaced intervals along its length honey-combed mini-venturi sections, esch of said runner means further having at least two ducts communicating through a sidewall in said runner means, at least one of said ducts having a plenum at one end thereof which is in direct communication with an open space in said runner means between said mini-venturi sections, said at least one duct having an opposite end to said one end, said opposite end being in communication with a remaining one of said runner means, said ducts serving to redirect gaseous flow from one of said runner means serving a first cylinder to a succeeding one of said runner means which serves a second cylinder, said second cylinder follows in sequential firing order said first cylinder.

* * * * *